(12) United States Patent
Heaton

(10) Patent No.: US 7,982,645 B2
(45) Date of Patent: Jul. 19, 2011

(54) METHOD AND DEVICE FOR GENERATING AN ELECTRICAL SIGNAL WITH A WIDE BAND ARBITRARY WAVEFORM

(75) Inventor: John Heaton, Malvern (GB)

(73) Assignee: U2T Photonics UK Limited, London (GB)

( * ) Notice: Subject to any disclaimer, the term of this patent is extended or adjusted under 35 U.S.C. 154(b) by 0 days.

(21) Appl. No.: 12/095,553

(22) PCT Filed: Nov. 28, 2006

(86) PCT No.: PCT/GB2006/004436
§ 371 (c)(1),
(2), (4) Date: Mar. 22, 2010

(87) PCT Pub. No.: WO2007/063288
PCT Pub. Date: Jun. 7, 2007

(65) Prior Publication Data
US 2010/0201554 A1 Aug. 12, 2010

(30) Foreign Application Priority Data
Dec. 1, 2005 (GB) .................................. 0524460.3

(51) Int. Cl.
*H03M 1/00* (2006.01)
(52) U.S. Cl. ......................................... 341/137; 356/502
(58) Field of Classification Search .................. 341/137; 356/502; 342/167; 359/158, 124, 279; 372/26
See application file for complete search history.

(56) References Cited

U.S. PATENT DOCUMENTS

| | | | |
|---|---|---|---|
| 5,084,856 A * | 1/1992 | Henmi et al. .................. | 369/116 |
| 5,262,786 A * | 11/1993 | Cross ............................ | 342/167 |
| 5,428,697 A | 6/1995 | Dolfi et al. | |
| 5,526,170 A | 6/1996 | Esman et al. | |
| 5,710,651 A | 1/1998 | Logan, Jr. | |
| 6,559,986 B1 | 5/2003 | Sauer et al. | |
| 6,671,298 B1 | 12/2003 | Delfyett et al. | |
| 2002/0067747 A1 | 6/2002 | Jalali et al. | |
| 2002/0149824 A1 * | 10/2002 | Beaulieu et al. .............. | 359/158 |
| 2005/0128554 A1 | 6/2005 | Wickham et al. | |
| 2005/0135731 A1 | 6/2005 | Welch et al. | |
| 2006/0215175 A1 * | 9/2006 | Yacoubian ................... | 356/502 |

FOREIGN PATENT DOCUMENTS
WO WO 02/054204 A2 7/2002

OTHER PUBLICATIONS
Search Report, dated Apr. 12, 2006, Application No. GB0524460.3.

* cited by examiner

*Primary Examiner* — Jean Jeanglaude
(74) *Attorney, Agent, or Firm* — Howard & Howard Attorneys PLLC

(57) ABSTRACT

A device for generating an electrical signal with a wide band arbitrary waveform includes at least two continuous wave lasers each being adapted to produce light at a different wavelength. The device also includes at least one pulse generator adapted to convert the light from the lasers into optical pulse trains and a plurality of optical modulators. Each modulator is adapted to receive an optical pulse train at at least one wavelength and modulate the optical pulse train in response to an electromagnetic signal. An optically dispersive element is adapted to receive the optical pulse trains from the modulators and to introduce a wavelength dependent delay between the optical pulse trains. The device further includes a photodetector for receiving the modulated dispersed optical pulse trains and producing an analogue electrical signal in response thereto.

31 Claims, 8 Drawing Sheets

US 7,982,645 B2

METHOD AND DEVICE FOR GENERATING AN ELECTRICAL SIGNAL WITH A WIDE BAND ARBITRARY WAVEFORM

The subject patent application claims priority to and all the benefits of International Application No. PCT/GB2006/04436, which was filed on Nov. 28, 2006 with the World Intellectual Property Organization.

The present invention relates to a method and device for generating an electrical signal with a wide band arbitrary waveform.

Devices for generating arbitrary wide band electrical waveforms are known. PCT/GB02/00019 discloses such a system. All such systems however involve time division multiplexing (TDM) and are difficult or expensive to manufacture.

Accordingly, in a first aspect, the present invention provides a device for generating an electrical signal with a wide band arbitrary waveform comprising
(i) at least two continuous wave lasers each being adapted to produce light at a different wavelength;
(ii) at least one pulse generator adapted to convert the light from the lasers into optical pulse trains;
(iii) a plurality of optical modulators, each modulator being adapted to receive an optical pulse train at at least one wavelength and modulate the optical pulse train in response to an electromagnetic signal;
(iv) an optically dispersive element adapted to receive the optical pulse trains from the modulators and to introduce a wavelength dependent delay between the optical pulse trains; and,
(v) a photodetector for receiving the modulated dispersed optical pulse trains and producing an analogue electrical signal in response thereto.

Such a device has the advantage that is can be manufactured from relatively simple components. It is relatively simple to manufacture and lightweight. This makes it particularly suitable for use in avionic systems including radar jamming and RF false target generation systems.

Preferably, the electromagnetic signal is a microwave signal.

Preferably, the device further comprises an optical combiner for receiving the output of the plurality of lasers and to combine then into a single optical path, the combined output being received by a pulse generator which chops the light at a plurality of wavelengths into a plurality of optical pulse trains, the digital to analogue converter further comprising an optical splitter for receiving the optical pulse trains from the pulse generator and splitting them into a plurality of wavelength dependent paths, each wavelength dependent path being connected to an optical modulator.

Preferably, at least one of the optical combiner and optical splitter comprises an arrayed waveguide grating.

Each pulse generator can be adapted to receive the output from a laser, the output pulse from each pulse generator being received by a corresponding optical modulator.

The optically dispersive element can comprise a plurality of optical fibres each being adapted to receive an output from a corresponding optical modulator, each optical fibre being adapted to introduce a predetermined delay into the optical pulse train passing through it.

Preferably, the device further comprises an optical combiner between the optical fibres and photodetector, the optical combiner being adapted to combine the outputs from the plurality of optical fibres into a single optical path which is received by the photodetector.

The optical combiner can be an arrayed waveguide grating.

The device can further comprise an optical combiner for receiving the output of the plurality of modulators and combining these into a single optical path which is received by the optically dispersive element.

The optically dispersive element can be a fibre optic cable.

Alternatively, the optically dispersive element is a Fibre Bragg Grating.

Alternatively, the optically dispersive element is an Echelle grating.

In a further aspect of the invention there is provided a device for generating an electrical signal with a wide band arbitrary waveform
(i) at least two continuous wave lasers each being adapted to produce light at a different wavelength;
(ii) a plurality of modulators, each being adapted to receive light at least one wavelength and to modulate the light in response to an electromagnetic signal.
(iii) at least one pulse generator adapted to receive the light from the modulators and convert it into optical pulse trains;
(iv) an optically dispersive element adapted to receive the optical pulse trains from the at least one pulse generator and to introduce a wavelength dependent delay between the optical pulse trains; and,
(v) a photodetector for receiving the modulated dispersed optical pulse trains and producing an analogue signal in response thereto.

Such a device has the advantage that is can be manufactured from relatively simple components. It is relatively simple to manufacture and lightweight. This makes it particularly suitable for use in avionic systems including, radar jamming and RF false target generation systems.

Preferably, the electromagnetic signal is a microwave signal.

Preferably, the device further comprises a plurality of pulse generators each pulse generator being adapted to receive the output of a corresponding modulator.

Preferably, the dispersive optical element comprises a plurality of optical fibres each being adapted to receive the output from a corresponding pulse generator, each fibre being adapted to introduce a predetermined delay into the optical pulse train passing through it.

Preferably, the device further comprises an optical combiner between the optical fibres and the photodetector, the optical combiner being adapted to combine the outputs from the plurality of optical fibres into a single optical path which is received by the photodetectors.

Preferably, the device further comprises an optical combiner between the pulse generators and optically dispersive element, the optical combiner being adapted to receive the optical pulse trains from the plurality of modulators and combine them into a single optical path which is received by the dispersive optical element.

Preferably, the device further comprises an optical combiner between the plurality of modulators and the pulse generator, the optical combiner being adapted to receive the modulated light from the plurality of modulators and combine it into a single optical path which is received by the pulse generator.

The dispersive optical element can comprise an optical fibre.

Alternatively, the dispersive optical element comprises a Fibre Bragg Grating.

In a further alternative the dispersive optical element comprises an Echelle grating.

Preferably, the dispersive optical element comprises an optical splitter for splitting the received optical signal into a plurality of wavelength dependent paths, an optical combiner for combining a plurality of wavelength dependent paths into a single optical path and a plurality of optical fibres, each fibre extending between an output of the optical splitter and a corresponding input of the optical combiner.

In a further aspect of the invention there is provided a method of generating an electrical signal with a wide band arbitrary waveform comprising the steps of (i) providing a plurality of continuous wave lasers each being adapted to provide light at a different wavelength;

(ii) passing the light from each of the lasers through a different modulator where it is modulated by a received electromagnetic signal;

(iii) chopping the light into optical pulse trains;

(iv) introducing a time delay between each of the optical pulse trains;

(v) converting the optical pulse trains to an analogue electrical signal by means of a photodetector.

Preferably the received electromagnetic signal is a microwave signal.

Preferably, the light is chopped into optical pulses before modulation.

The time delay can be introduced between the pulses by means of at least one optical fibre.

The time delay can be introduced between the pulses by means of at least one of an Eschelle grating or Fibre Bragg Grating.

The light from the plurality of lasers can be combined into a single optical path by means of at least one arrayed waveguide grating before being received by the photodetector.

The present invention will now be described by way of example only, and not in any limitative sense with reference to the accompanying drawings in which FIG. 1 shows in schematic form a first embodiment of a digital to analogue converter according to the invention;

Figure 1:
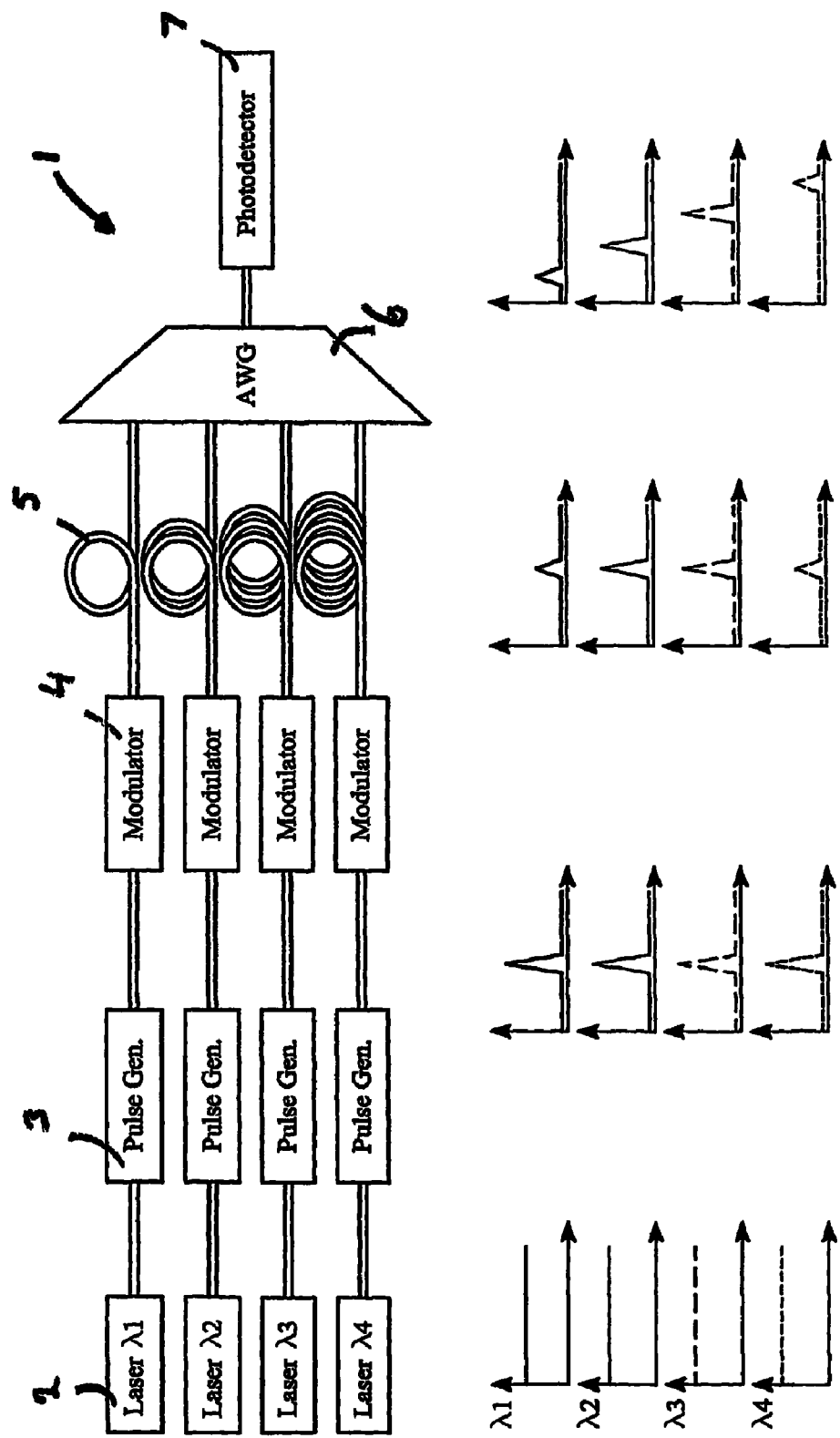

Shown in FIG. 1 is a first embodiment of a device according to the invention. The device 2 comprises a plurality of continuous wave (CW) lasers 2. Each laser 2 generates light at a different wavelength. A separate pulse generator 3 is connected to the output of each of the lasers 2 as shown. The pulse generators convert 3 the continuous wave outputs of the laser 2 into pulses. A typical pulse length is of the order one to 1000 picoseconds, preferably of the order 10 to 1000 picoseconds. The outputs of the pulse generators 3 are each passed to separate modulators 4. As the pulses are passed through the modulators 4 they are modulated by a received microwave signal (not shown). The operation of such modulators 4, for example, Mach Zehnder modulators is well known and will not be discussed further. Each modulator 4 receives a different modulating signal and so will modulate the pulse passing through it by a different amount.

On exiting the modulators 4 the pulses pass through an optically dispersive component 5. This comprises a plurality of optical fibres 5 each one connected to a modulator 4 such that each pulse passes along a different path. The fibres 5 are of different lengths such that a predetermined time delay is introduced between the pulses as they exit the fibres 5.

The pulses are then combined by an optical combiner 6 comprising an arrayed waveguide grating 6 into a single optical path. The pulses travel along this path to a photodetector. The photodetector 7 converts the pulses into a wideband electrical signal.

Figure 2:
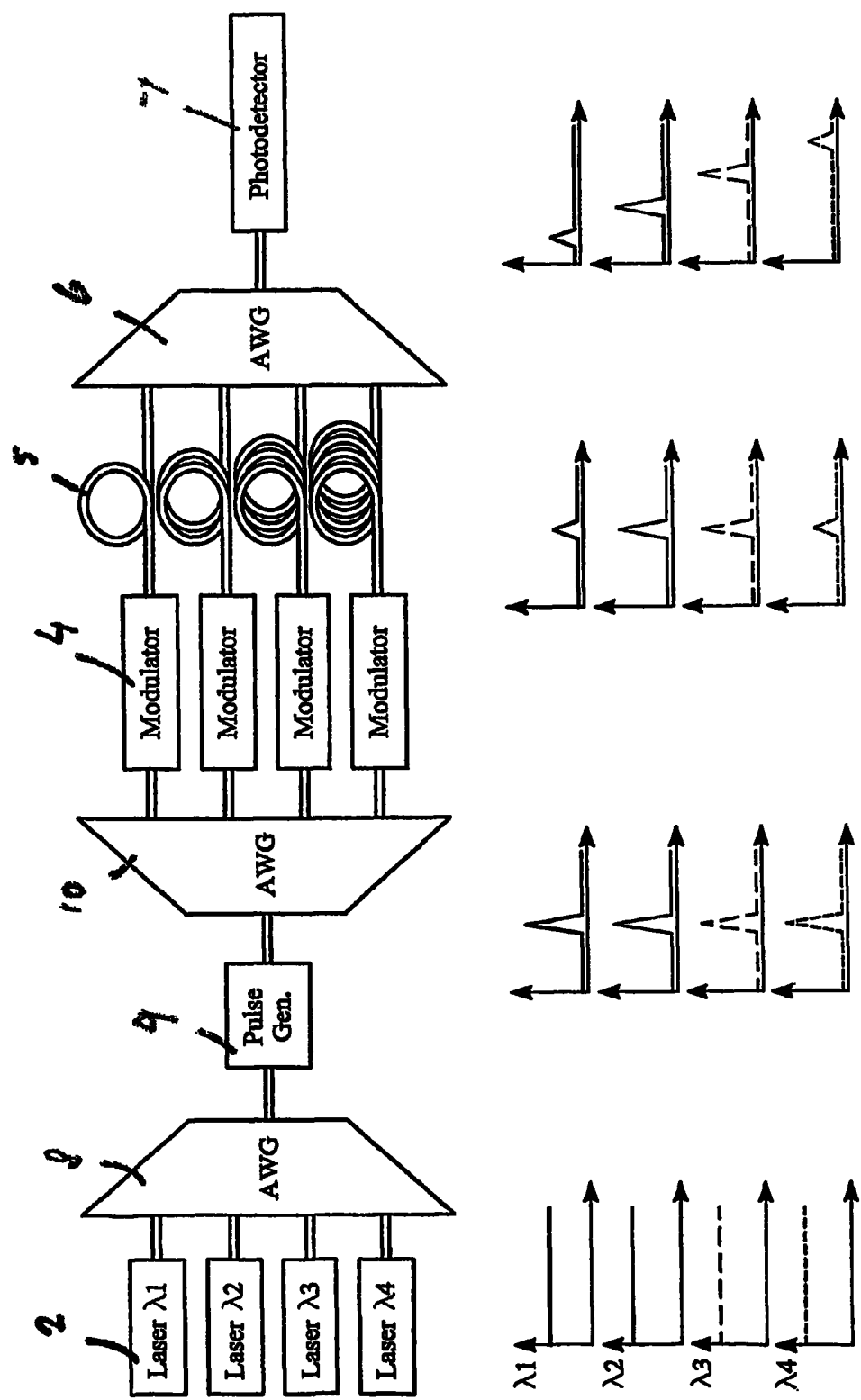
FIG. 2 shows in schematic form a second embodiment of a digital to analogue converter according to the invention.

Shown in FIG. 2 is a second embodiment of the invention. This embodiment is identical to that of FIG. 1 except for the pulse generation stage. In this embodiment the output of the laser 2 is combined by an arrayed waveguide grating 8 into a single optical path which is received by a single pulse generator 9. The pulse generator 9 simultaneously chops all the wavelengths passing through it into optical pulses.

The optical pulses exiting the pulse generator 9 are split into a plurality of wavelength dependent paths by an optical splitter 10 comprising a second arrayed waveguide grating 10. The output of this optical splitter 10 is received by the plurality of modulators 4 as described above.

This embodiment has an advantage over that shown in FIG. 1 in that as only one pulse generator 9 is used to chop the continuous wave output of the lasers 2 they can be chopped simultaneously with a very high accuracy.

Figure 3:
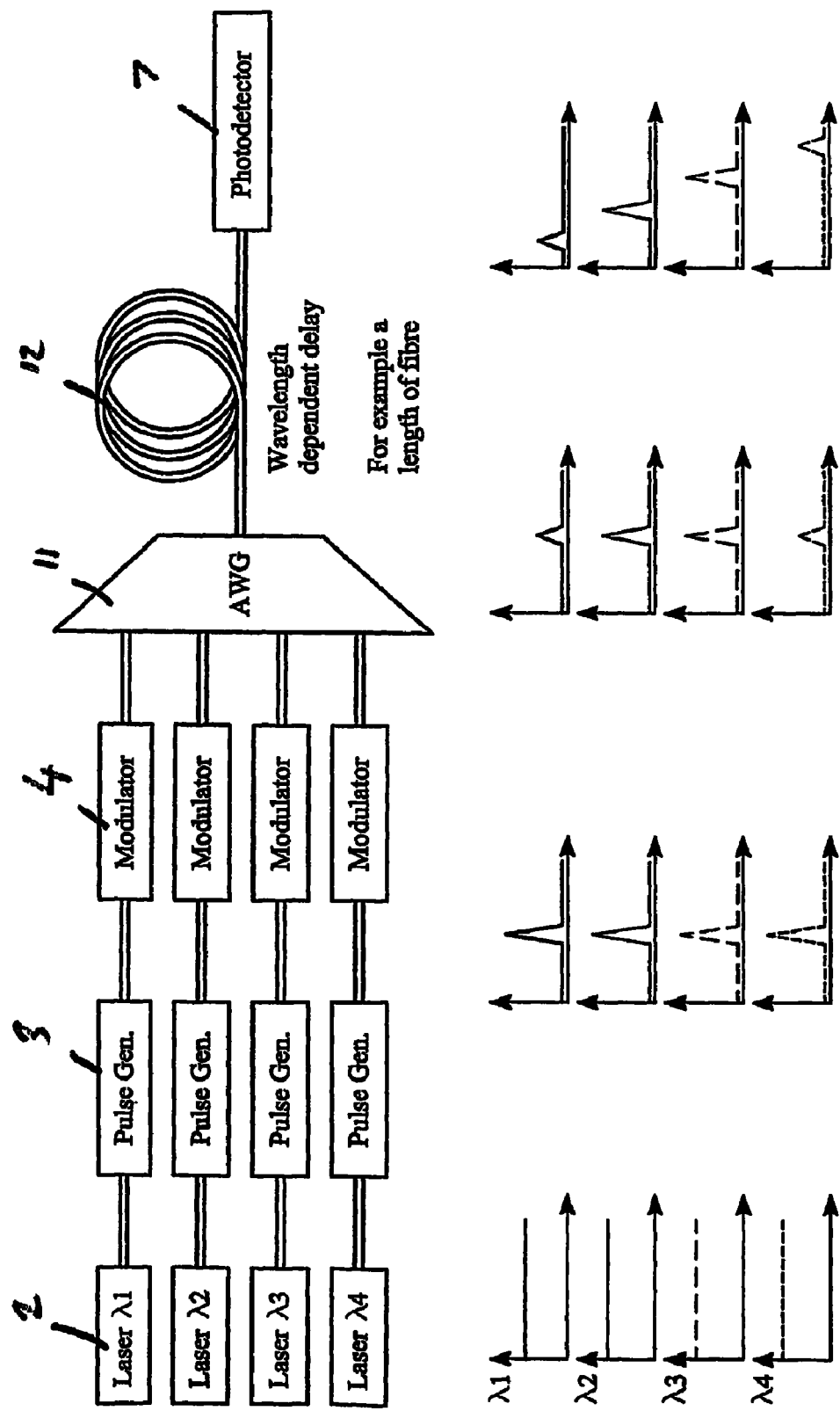
FIG. 3 shows in schematic form a third embodiment of a digital to analogue converter according to the invention.

Shown in FIG. 3 is a third embodiment of the device according to the invention. This embodiment is identical to that of FIG. 1 except for the optically dispersive element. In this embodiment the pulses which exit the modulators 4 are combined together by a optical combiner 11 comprising an Arrayed Waveguide Grating(AWG) 11. The combined signal is then passed through an optical fibre 12 to the photodetector 7. The optical fibre 12 will have a different refractive index at different wavelengths so introducing a time delay between the pulses.

Figure 4:
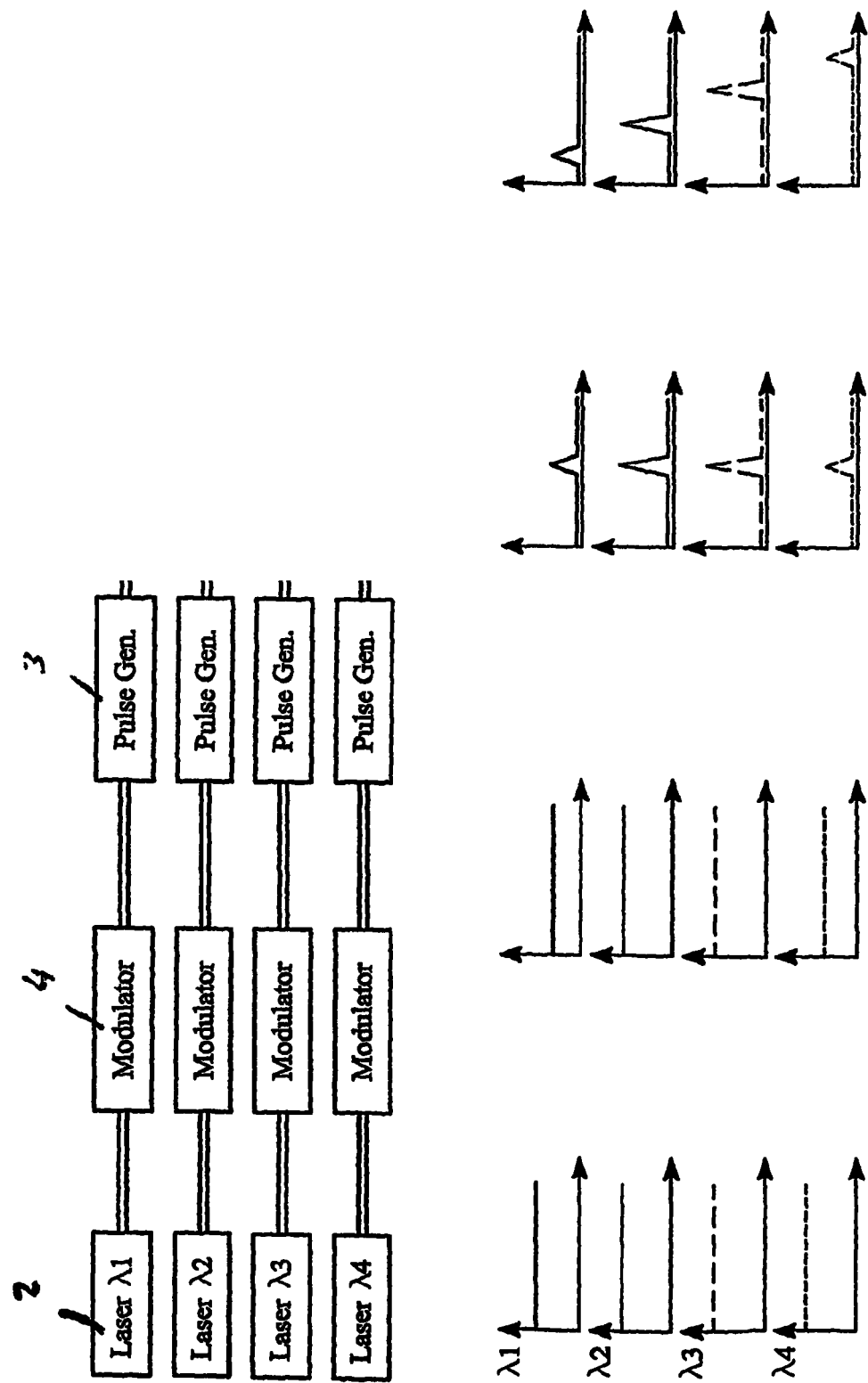
FIG. 4 shows in schematic form a fourth embodiment of a digital to analogue converter according to the invention.

Shown in FIG. 4 is a further embodiment of a device according to the invention. This embodiment is identical to that of FIG. 1 except the positions of the modulators 4 and pulse generators 3 are interchanged. In this embodiment modulation is preferably performed before chopping the pulses by the pulse generator 3.

Figure 5:
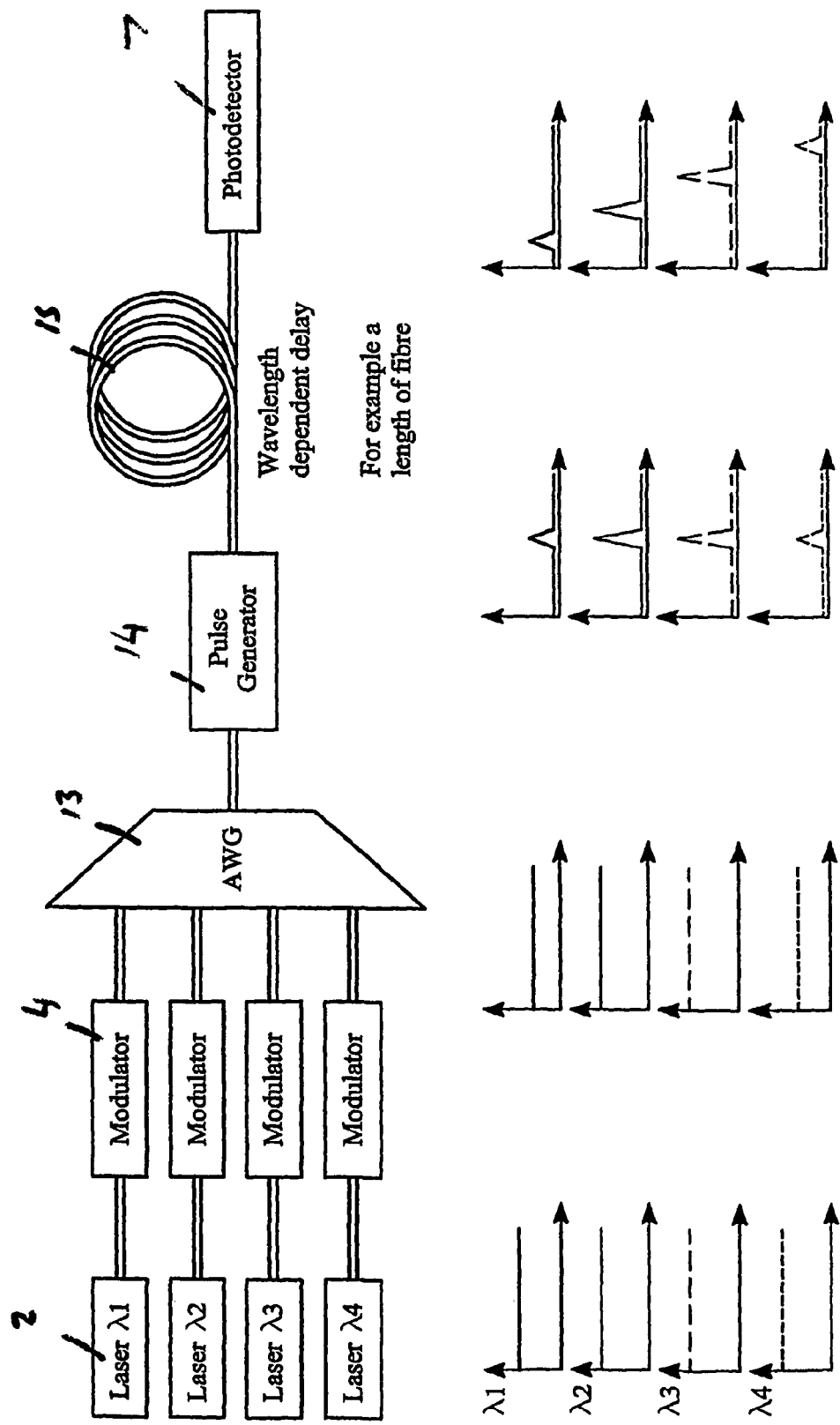
FIG. 5 shows in schematic form a fifth embodiment of a digital to analogue converter according to the invention.

Shown in FIG. 5 is a further embodiment of a device according to the invention. In this embodiment the continuous, wave output of the laser 2 is passed through separate modulators 4. After modulation the modulated continuous waves are combined by an arrayed waveguide grating 13. The output of the AWG 13 is passed through a pulse generator 14 which simultaneously chops all of the continuous waves into pulses. The pulses are then passed along a dispersive optical fibre 15 which introduces a wavelength dependent time delay between the pulses before being received by the photodetector 7.

Figure 6:
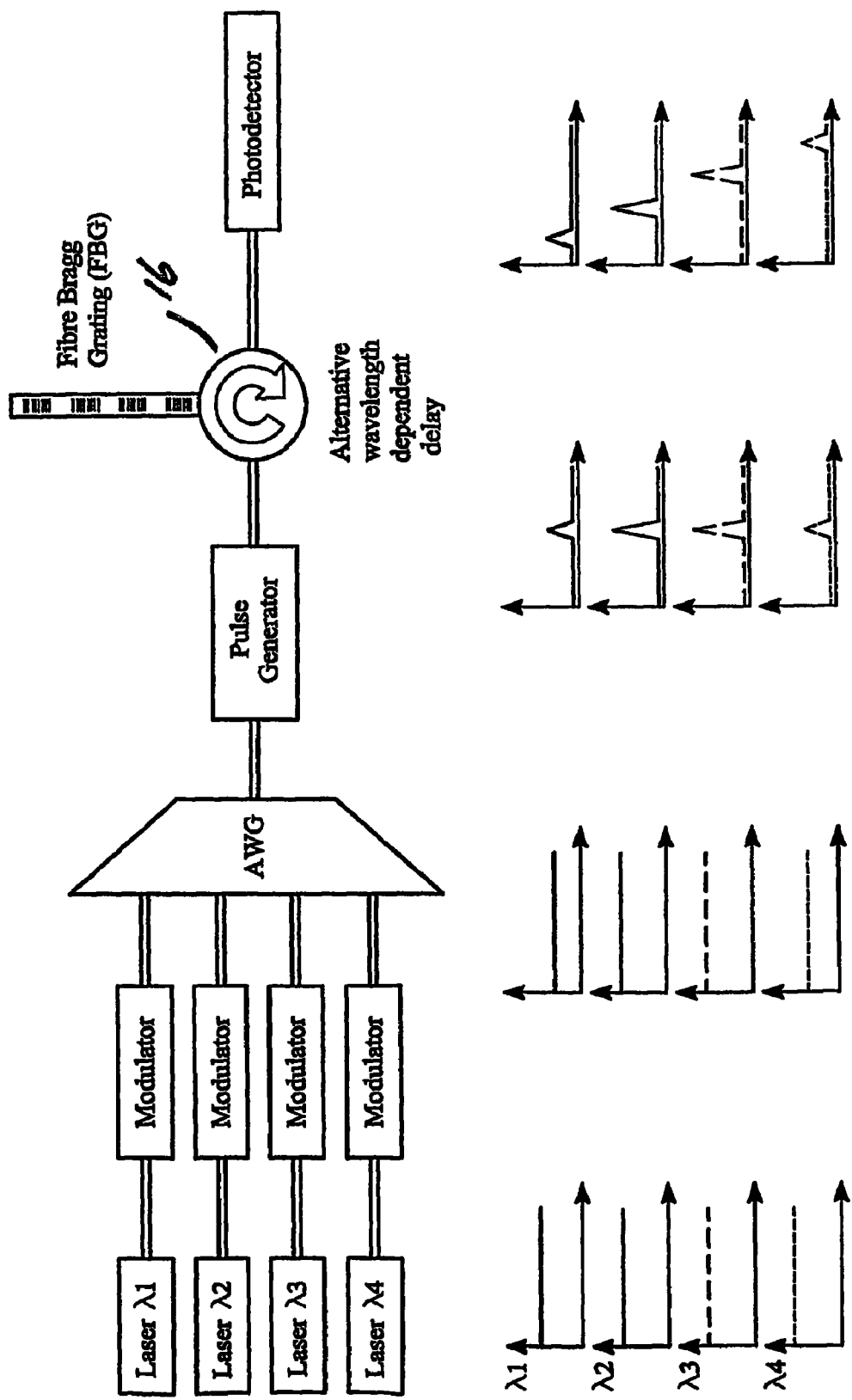
FIG. 6 shows in schematic form a sixth embodiment of a digital to analogue converter according to the invention.
Figure 7:
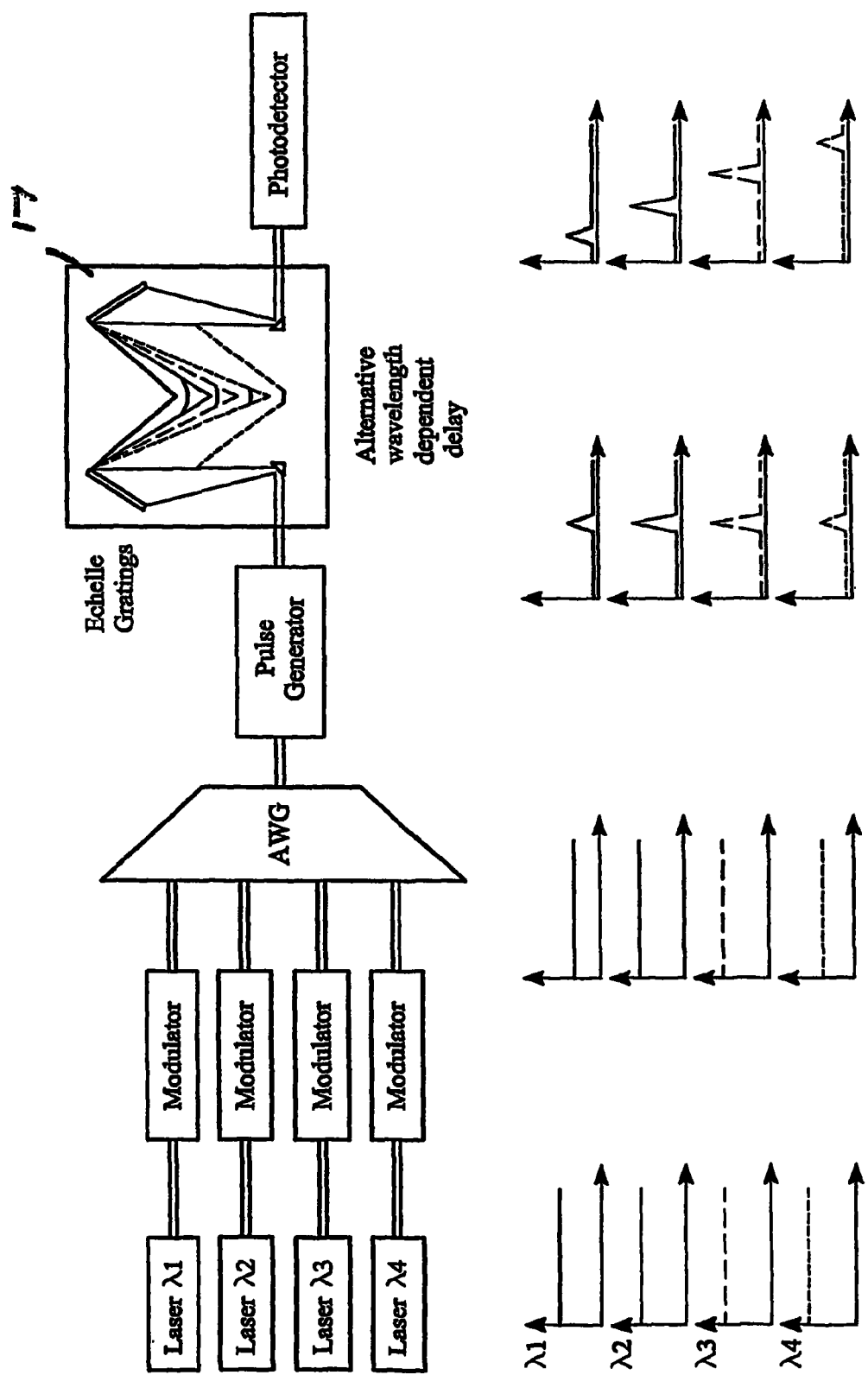
FIG. 7 shows in schematic form a seventh embodiment of a digital to analogue converter according to the invention.

The embodiment of FIGS. 6 and 7 are identical to that of FIG. 5 except the dispersive optical fibre 15 is replaced by a Fibre Bragg Grating 16 and Echelle grating 17 respectively. The operation of such gratings is well known and will not be discussed further.

Figure 8:
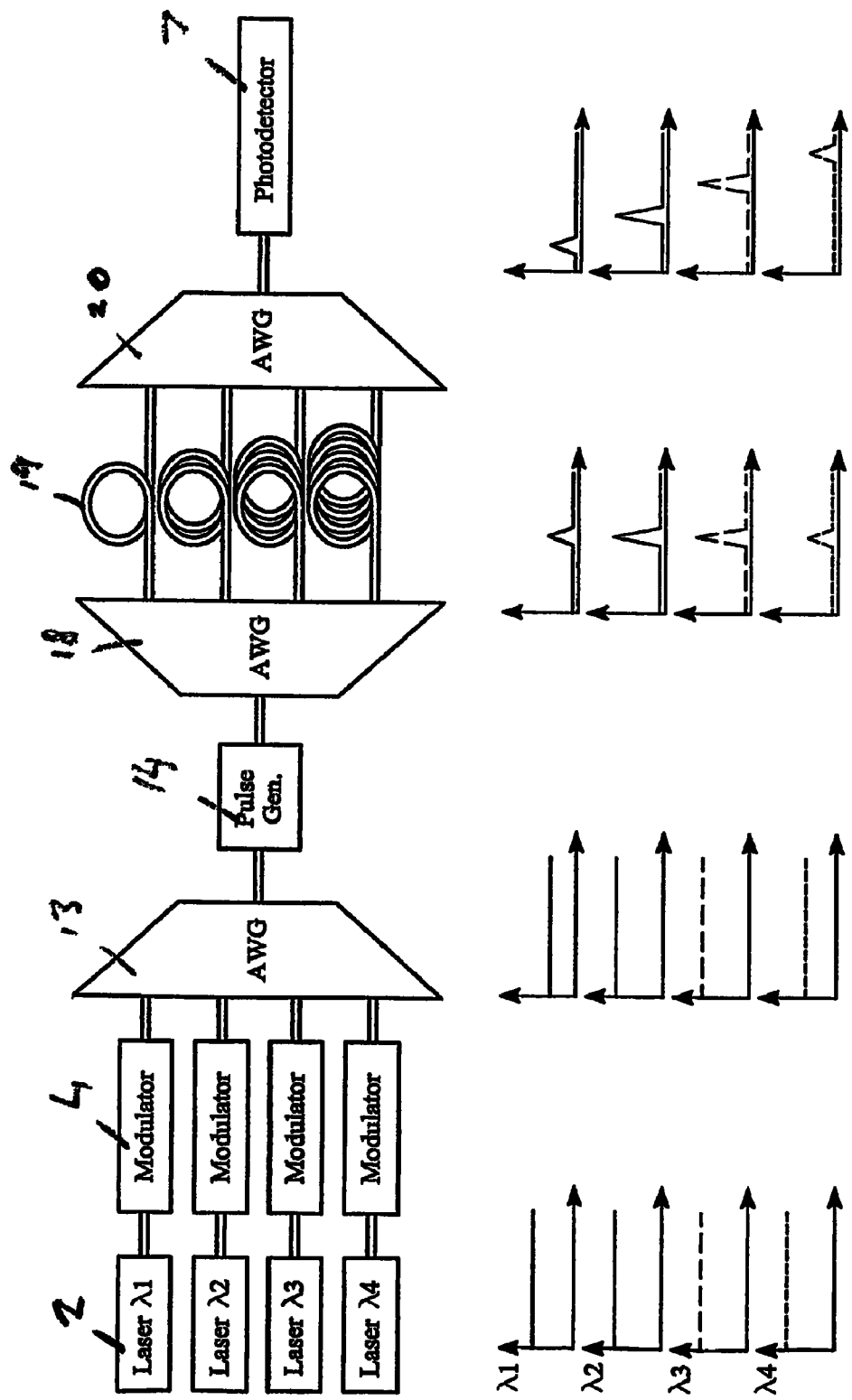
FIG. 8 shows in schematic form a eighth embodiment of a digital to analogue converter according to the invention.
Figure 4:
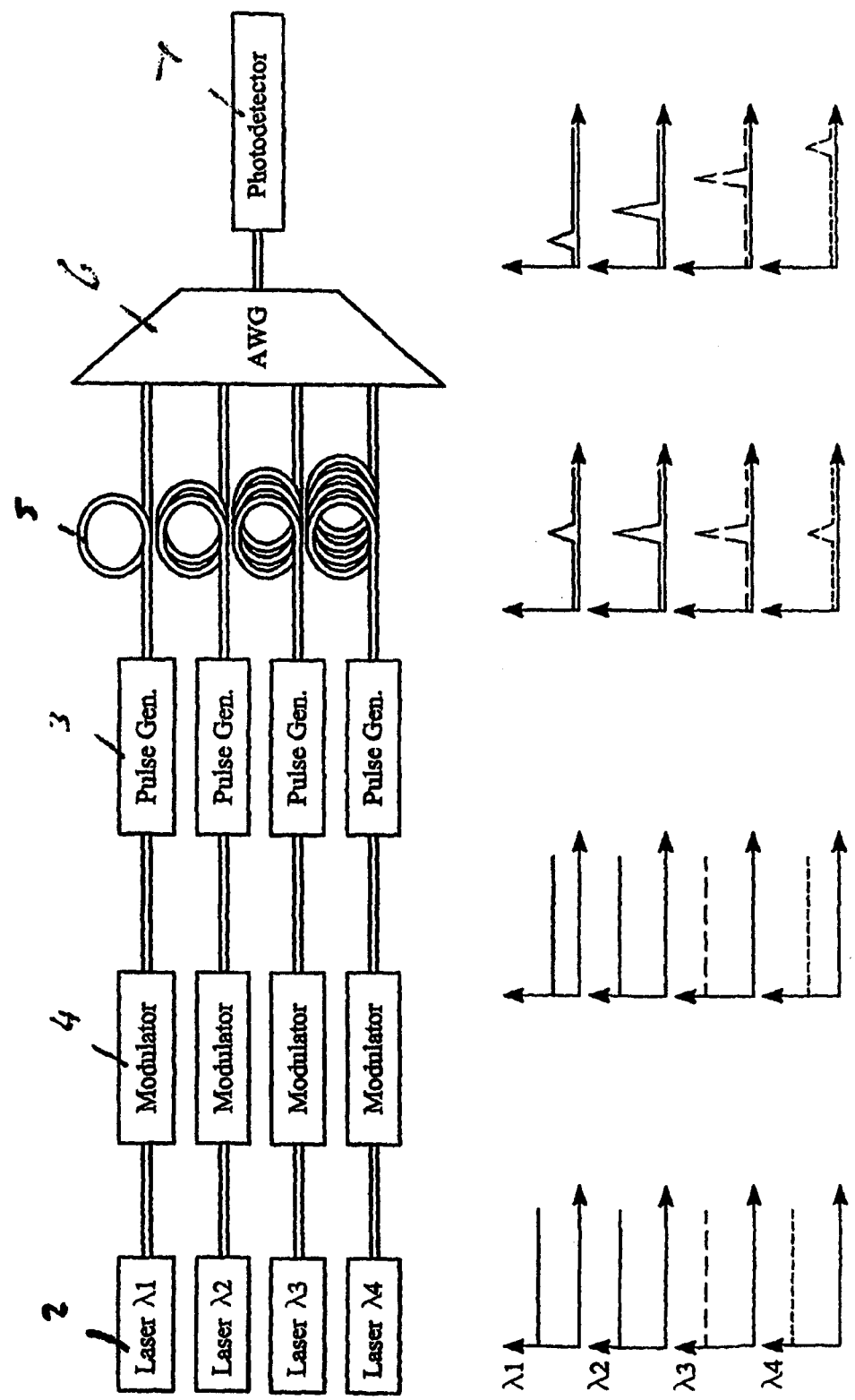

Shown in FIG. 8 is a further embodiment of the invention. In this invention the optically dispersive element comprises an arrayed waveguide grating 18 which splits the pulses into a plurality of wavelength dependent paths. The pulses then each travel down different optical fibres 19. The fibres are designed such that there is a wavelength dependent time delay between the pulses as they exit the fibres. An optical combiner 20 comprising an AWG 20 combines the dispersed optical pulses into a single optical channel which is received by the photodetector 7.

The invention claimed is:

1. A device for generating an electrical signal with a wide band arbitrary waveform comprising:
    (i) at least two continuous wave lasers each being adapted to produce light at a different wavelength;
    (ii) at least one pulse generator adapted to receive light from the lasers at the wavelength of the lasers and to convert the light from the lasers into optical pulse trains at those wavelengths;
    (iii) a plurality of optical modulators, each modulator being adapted to receive an optical pulse train at at least one wavelength and modulate the optical pulse train in response to an electromagnetic signal;
    (iv) an optically dispersive element adapted to receive the optical pulse trains from the modulators and to introduce a wavelength dependent delay between the optical pulse trains; and
    (v) a photodetector for receiving the modulated dispersed optical pulse trains and producing an analogue electrical signal in response to the optical pulse trains.

2. A device as claimed in claim 1, further comprising an optical combiner for receiving the outputs of the plurality of lasers and for combining the outputs into a single optical path, the combined output being received by a pulse generator which chops the light at a plurality of wavelengths into a plurality of optical pulse trains, and further comprising an optical splitter for receiving the optical pulse trains from the pulse generator and splitting them into a plurality of wavelength dependent paths, each wavelength dependent path being connected to an optical modulator.

3. A device as claimed in claim 2, wherein at least one of the optical combiner and optical splitter comprises an arrayed waveguide grating.

4. A device as claimed in claim 1, comprising a plurality of pulse generators, each pulse generator being adapted to receive the output from a laser, the output pulse from each pulse generator being received by a corresponding optical modulator.

5. A device as claimed in claim 1 wherein the optically dispersive element comprises a plurality of optical fibres each being adapted to receive an output from a corresponding optical modulator, each optical fibre being adapted to introduce a predetermined delay into the optical pulse train passing through it.

6. A device as claimed in claim 5, further comprising an optical combiner between the optical fibres and the photodetector, the optical combiner being adapted to combine the outputs from the plurality of optical fibres into a single optical path which is received by the photodetector.

7. A device as claimed in claim 6, wherein the optical combiner is an arrayed waveguide grating.

8. A device as claimed in claim 1 further comprising an optical combiner for receiving the output of the plurality of modulators and combining these into a single optical path which is received by the optically dispersive element.

9. A device as claimed in claim 8, wherein the optically dispersive element is a fibre optic cable.

10. A device as claimed in claim 8, wherein the optically dispersive element is a Fibre Bragg Grating.

11. A device as claimed in claim 8, wherein the optically dispersive element is an Echelle grating.

12. A device for generating an electrical signal with a wide band arbitrary waveform, said device comprising:
    (i) at least two continuous wave lasers each being adapted to produce light at a different wavelength;
    (ii) a plurality of modulators, each modulator being adapted to receive light at at least one wavelength and to modulate the light in response to a microwave signal;
    (iii) at least one pulse generator adapted to receive the light from the modulators at the wavelengths of the lasers and convert it into optical pulse trains of those wavelengths;
    (iv) an optically dispersive element adapted to receive the optical pulse trains from the at least one pulse generator and to introduce a wavelength dependent delay between the optical pulse trains; and
    (v) a photodetector for receiving the modulated dispersed optical pulse trains and producing an analogue signal in response thereto.

13. A device as claimed in claim 12, comprising a plurality of pulse generators with each pulse generator being adapted to receive the output of a corresponding modulator.

14. A device as claimed in claim 13, wherein the dispersive optical element comprises a plurality of optical fibres each being adapted to receive the output from a corresponding pulse generator, each fibre being adapted to introduce a predetermined delay into the optical pulse train passing through it.

15. A device as claimed in claim 14, further comprising an optical combiner between the optical fibres and the photodetector, the optical combiner being adapted to combine the outputs from the plurality of optical fibres into a single optical path which is received by the photodetectors.

16. A device as claimed in claim 13, further comprising an optical combiner between the pulse generators and optically dispersive element, the optical combiner being adapted to receive the optical pulse trains from the plurality of modulators and combine them into a single optical path which is received by the dispersive optical element.

17. A device as claimed in claim 16 wherein the dispersive optical element comprises an optical splitter for splitting the received optical signal into a plurality of wavelength dependent paths, an optical combiner for combining a plurality of wavelength dependent paths into a single optical path and a plurality of optical fibres, each fibre extending between an output of the optical splitter and a corresponding input of the optical combiner.

18. A device as claimed in claim 16 wherein the dispersive optical element comprises an optical fibre.

19. A device as claimed in claim 16 wherein the dispersive optical element comprises a Fibre Bragg Grating.

20. A device as claimed in claim 16 wherein the dispersive optical element comprises an Echelle grating.

21. A device as claimed in claim 12, further comprising an optical combiner between the plurality of modulators and the pulse generator, the optical combiner being adapted to receive the modulated light from the plurality of modulators and combine the modulated light into a single optical path which is received by the pulse generator.

22. A device as claimed in claim 21 wherein the dispersive optical element comprises an optical fibre.

23. A device as claimed in claim 21 wherein the dispersive optical element comprises a Fibre Bragg Grating.

24. A device as claimed in claim 21 wherein the dispersive optical element comprises an Echelle grating.

25. A device as claimed in claim 21 wherein the dispersive optical element comprises an optical splitter for splitting the received optical signal into a plurality of wavelength dependent paths, an optical combiner for combining a plurality of wavelength dependent paths into a single optical path and a plurality of optical fibres, each fibre extending between an output of the optical splitter and a corresponding input of the optical combiner.

26. A method of generating an electrical signal with a wide band arbitrary waveform comprising the steps of:
(i) providing a plurality of continuous wave lasers each being adapted to provide light at a different wavelength;
(ii) passing the light from each of the lasers at the wavelength of the lasers through a different modulator where it is modulated by a received digital signal;
(iii) chopping the light at the wavelength of the lasers into optical pulse trains at those wavelengths; and
(iv) introducing a time delay between each of the optical pulse trains;
(v) converting the optical pulse trains to an analogue electrical signal by means of a photodetector.

27. A method as claimed in claim 26, wherein the light is chopped into optical pulse trains before modulation.

28. A method as claimed in claim 26 wherein the time delay is introduced between the optical pulse trains by means of at least one optical fibre.

29. A method as claimed in claim 28 wherein the light from the plurality of lasers is combined into a single optical path by means of at least one arrayed waveguide grating before being received by the photodetector.

30. A method as claimed in claim 26 wherein the time delay is introduced between the optical pulse trains by means of at least one of an Eschelle grating or Fibre Bragg Grating.

31. A method as claimed in claim 30 wherein the light from the plurality of lasers is combined into a single optical path by means of at least one arrayed waveguide grating before being received by the photodetector.

* * * * *

UNITED STATES PATENT AND TRADEMARK OFFICE
CERTIFICATE OF CORRECTION

Page 1 of 2

PATENT NO. : 7,982,645 B2
APPLICATION NO. : 12/095553
DATED : July 19, 2011
INVENTOR(S) : John Heaton It is certified that error appears in the above-identified patent and that said Letters Patent is hereby corrected as shown below:

IN THE DRAWINGS:
Replace the current Figure 4 with the Figure 4 as shown: (see attached sheet)

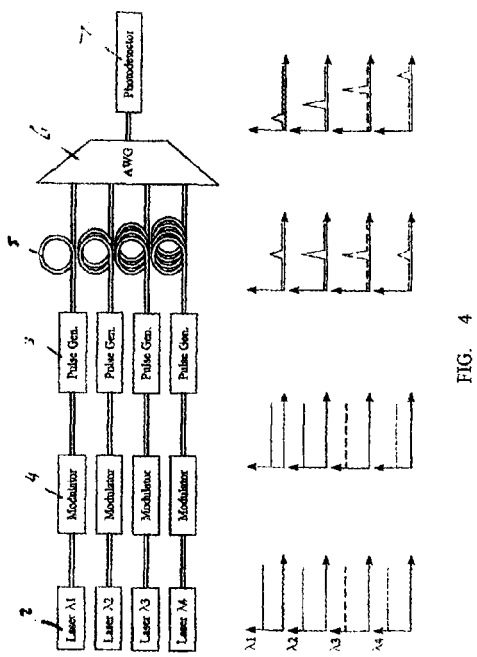

Signed and Sealed this
Thirtieth Day of August, 2011

David J. Kappos
*Director of the United States Patent and Trademark Office*